Nov. 2, 1926.
L. H. CORMIER
1,605,810
PISTON AND PISTON RING
Filed Jan. 5, 1926
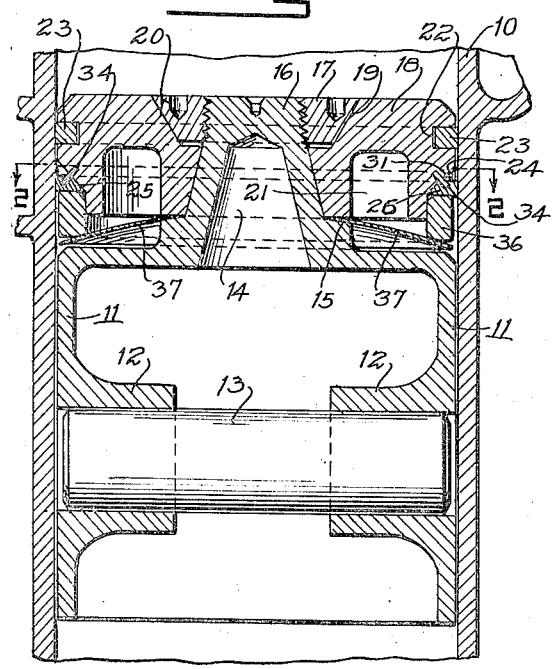
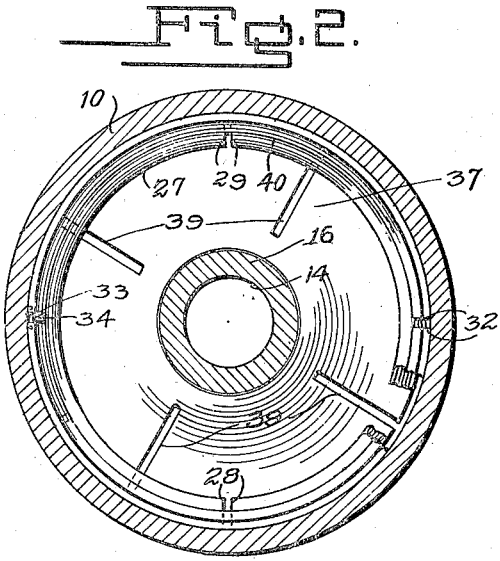
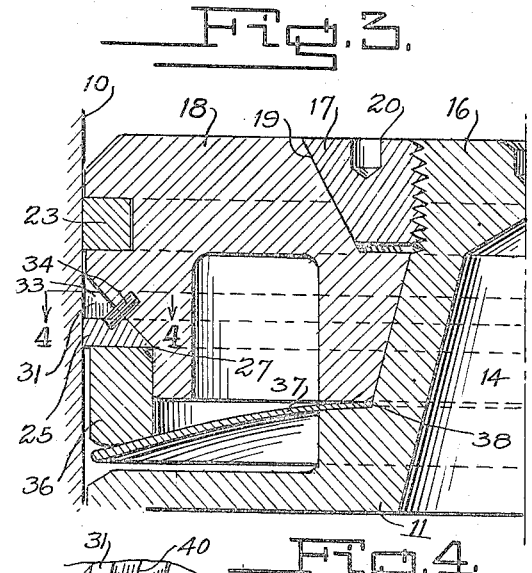
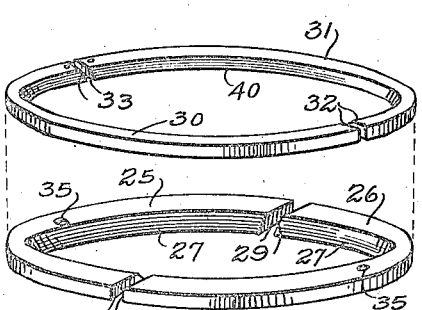
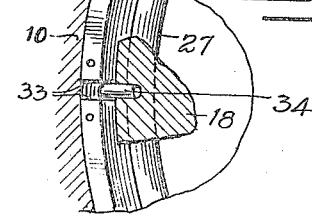
Inventor
Leo H. Cormier
By Lancaster and Allwine
Attorneys Patented Nov. 2, 1926.

1,605,810

UNITED STATES PATENT OFFICE.

LEO HENRY CORMIER, OF DETROIT, MICHIGAN.

PISTON AND PISTON RING.

Application filed January 5, 1926. Serial No. 79,490.

The present invention relates to piston and ring construction for internal combustion engines, and other types of motors or machines utilizing pistons and rings.

An object of the present invention is to provide a piston and ring construction wherein the ring is so constructed and mounted that the three major results sought to be attained in the art may be accomplished, such results being the complete filling of the piston ring groove; conformation of the ring to the shape of the cylinder wall; and controllable uniform radial pressure of the ring against the cylinder wall.

The invention aims to provide a piston ring structure wherein the ring is compressible not only axially of the piston but also radially therefrom to provide an effective seal of the ring in the groove and also between the ring and the cylinder wall, the pressure being regulated or controlled by the utilization of a spring member of desired tension.

Another feature of the invention is to provide a piston and ring construction which effects the radial and axial compression of the ring by means which is not readily susceptible to change in its inherent elasticity or resiliency when subjected to intense heat and which will more readily maintain its original shape and pressure effort than devices of a kindred nature heretofore invented and tested out.

A further object of the invention is to provide a piston and ring structure which comprises but few parts most of which are interchangeable and which may be easily and quickly assembled and separated, and the members of the ring structure readily adapting themselves to any inequalities which may exist in the cylinder wall.

The above, and various other objects and advantages of this invention will in part be described, and in part be understood from, the following detailed description of the present preferred embodiment, the same being illustrated in the accompanying drawing, wherein:

Fig. 1 is a longitudinal central section taken through a piston and ring constructed according to the present invention and disposed in a cylinder, the latter being fragmentarily illustrated.

Fig. 2 is a transverse section through the same on the line 2—2 of Fig. 1.

Fig. 3 is a fragmentary enlarged section taken through one side of the piston and ring mounted in the cylinder.

Fig. 4 is a fragmentary transverse section taken through the structure of Fig. 3 on the line 4—4 thereof.

Fig. 5 is a perspective view of the piston ring showing the sections and parts thereof in separated position, and Fig. 6 is a detail perspective view of the spring member employed.

Referring to the drawing 10 designates a cylinder in which the piston and ring of this invention may be mounted.

The body 11 of the piston may be of any approved type provided with inwardly extending bosses or bearings 12 for supporting a wrist pin 13 to which a connecting rod may be attached in the usual manner. The upper part of the piston body 11 is provided with a central upwardly tapering post 14 provided exteriorly with an annular seat 15 which preferably slopes outwardly and downwardly to a slight degree. The upper end of the post terminates in an externally threaded stud 16 which closes the upper end of the post 14 and which affords a support for a lock nut 17 provided in its upper side with depressions or openings for the reception of a spanner wrench or like tool which may be used for turning the lock nut 17.

The piston 11 has a removable head 18 provided with a central downwardly flaring opening adapted to snugly receive the post 14 upwardly therethrough, and which is provided centrally and in its upper face with a recess or counterbore for the reception of the lock nut 17. The piston head 18 is provided in the counterbore with an upwardly flaring annular wall 19 and the lock nut 17 has a correspondingly inclined peripheral wall 20 adapted to seat against the head 18 and bind the same downwardly on the post 14 and toward the seat 15. To reduce the weight of the head 18, the latter may be cored out to provide an annular recess or opening 21 in the lower side of the head. Near its upper side, the head 18 is provided with a piston groove 22 of usual form to receive any suitable type of piston ring 23 adapted to receive the initial impact above the piston head and to initially seal the piston in the cylinder.

The lower portion of the piston head 18 is reduced in external diameter and is provided in spaced relation below the ring groove 22 with an inclined or cam shoulder 24 extending annularly about the head and facing downwardly and outwardly with respect thereto.

The improved piston ring is adapted to seat against the inclined shoulder 24 and comprises upper and lower ring members, the lower one of which is made in a pair of semi-circular sections 25 and 26 arranged to seat against the lower portion of the shoulder 24 and has an inner bevelled edge 27 machined to conform to the inclination of the shoulder 24 and which has the adjacent ends of its sections 25 and 26 at one side of the ring member terminating in spaced apart relation and with straight end walls 28. The ends of the sections 25 and 26 at the other side of the ring member terminate in spaced apart inclined or bevelled end walls 29 which are substantially parallel to each other. The upper ring member comprises a pair of semi-circular sections 30 and 31 which are of less width than the lower ring member and are adapted to seat against the upper portion of the shoulder 24. These sections 30 and 31 of the upper ring member have their adjacent end portions at opposite sides of the member spaced apart and terminating respectively in parallel straight end walls 32 and inclined or bevelled end walls 33.

In order that the ring may conform to the curvature of the wall of the cylinder 10 and remain always in a predetermined definite relation thereto, means is provided for holding the ring members from turning one upon the other and from turning with respect to the piston. This means comprises a pair of locking pins 34 which are partially seated in correspondingly shaped openings formed in the inclined shoulder 24 near its upper end, or at least at a point above the lower ring member. These pins 34 project downwardly and outwardly at substantially right angles to the shoulder 24 and engage between the straight walls 32 of the upper ring member and into a socket 35 which is formed in the lower ring member at the inclination of the pin so as not only to anchor the lower ring member against turning, but to also support the pin 34 against displacement from its opening in the piston head. Fig. 1 shows two pins 34 but the number of pins may be reduced or increased as found desirable.

In order to fill in the space at the lower end of the piston head 18 which provides a ring groove, a follower ring 36 is employed and is slidably fitted about the reduced end of the piston head 18 and against the lower side of the lower ring member and is given suitable axial length and thickness to project below the head 18 and to stand out therefrom in proximity to the peripheral portions of the ring.

For the purpose of creating a uniform radial pressure upon the piston ring, a spring disk 37 is provided which is of concavo-convex form having a central opening 38 of suitable size to fit over the post 14 of the piston 11 and which, at its inner marginal portion, is adapted to seat upon the shoulder 15 at the base of the post. The piston head 18 is held by the lock nut 17 downwardly against the inner marginal portion of the spring disk 37 to bind it in place about the post and on the seat 15. The spring disk 37 is of sufficient diameter to engage at its outer marginal edge portion beneath the follower ring 36, and is provided with a plurality of radial slots 39 permitting the free expansion or upward springing of the disk against the lower edge of the follower ring 36 to urge the same upwardly against the piston ring.

The disk 37 lies closely to the top of the piston body 11 so as to leave but a small opening beneath the spring disk. The upper pressure of the spring disk 37 against the follower ring causes the latter to compress the piston ring sections or members together and to cause them to slide upwardly on the shoulder 24, expanding the piston ring members and variably binding them against the inner wall of the cylinder 10. The upper ring member is provided with an inclined inner edge 40 which corresponds to the inclination of the shoulder 24 and seats thereagainst. The locking pins 34 hold the piston ring from turning, the upper member by engaging between the end walls of its sections 30 and 31 and the lower portion by engaging in the sockets 35. It is apparent that the spring pressure may be controlled by binding the piston head 18 more or less over the post and against the inner edge portion of the spring disk 37. The sections 25 and 26, and 30 and 31 of the lower and upper piston ring members are thus forced outwardly and together for closely fitting the cylinder wall and for effectively closing the ring groove or space. In order to facilitate the tightening or removal of the lock nut 17, a plurality of annular openings 41 are provided therein and in which may be inserted a pin wrench or the like.

It is of course understood that various changes and modifications may be made in the details of construction and design of the above specifically described embodiment of the invention without departing from the spirit thereof, and restricted only by the scope of the following claims.

What is claimed is:

1. In combination with a piston having an upstanding central portion, an adjustable ring fitting over said central portion, a ring groove in said adjustable ring with a downwardly and outwardly facing shoulder, an expansible piston ring fitting against said shoulder, and spring means adjustably mounted between the adjustable ring and the piston body for compressing the piston ring against said shoulder to close the groove and expand the ring against a cylinder wall.

2. In combination with a piston having an upstanding central portion, an adjustably mounted head adapted to fit on said central portion and provided with a ring groove having an outwardly inclined shoulder facing the other part, an expansible piston ring fitting in the groove against said shoulder to slide thereon, a follower ring positioned against the piston ring at the side of the latter remote from the shoulder, and a spring member interposed between the parts of the piston and engaging said follower ring to urge the same against the piston ring and expand it against said inclined shoulder.

3. In combination with a piston having a fixed body and an adjustable head mounted thereon, said head being provided with a ring groove having an upper shoulder facing downwardly and outwardly, superposed expansible ring members provided with inclined inner edges seating on said shoulder, and a spring member mounted between said adjustable head and fixed body of the piston to variably compress said ring members together and slide the same upwardly over said shoulder to expand the ring members.

4. In combination with a piston body having a post projecting upwardly from its central portion, and a head detachably fitting over the post, said head having a ring groove in its lower part and with an outwardly inclined shoulder at the upper end of the groove, an expansible piston ring seated against said shoulder in the groove, a follower ring in said groove against the piston ring, and a spring disk fitting over the post and clamped between the piston body and head for yielding engagement against the follower ring to force the piston ring upwardly about the inclined shoulder to expand the piston ring.

5. In combination with a two part piston, one part having a post on its outer end adapted to receive the second part thereover and said post having an annular shoulder at its base, a spring disk of concavo-convex form provided with a central opening fitting over said post and adjustably binding on said shoulder under action of said other member of the piston, said other member of the piston having a reduced lower end with an inclined shoulder facing downwardly and outwardly, an expansible piston ring seated against said shoulder in the reduced portion of said other piston member, and a follower ring interposed between the piston ring and said disk for expanding the piston ring upwardly over said inclined shoulder.

6. In combination with a piston having a body part and a head, said body part having a central post projecting upwardly therefrom and provided with a raised seat about the base of the post, said head having a central opening and fitting over the post, means for binding the head over the post and toward said seat, a dished spring disk having a central opening and fitting over the post upon said seat and held thereto by said head, said disk having radial slots in its outer portion to permit free flexing of the disk, said head having a ring groove in its lower part and provided with an upwardly inclined shoulder at the top of the groove, an expansible piston ring in said groove engaging the shoulder, and a follower ring in the lower end of the groove between the outer portion of the disk and the piston ring for expanding the latter upwardly over said shoulder.

7. In combination with a piston having a body portion and a head, a spring member interposed between the body portion and the head and extending outwardly between the same, said head having a ring groove above the spring member and an upwardly inclined shoulder at the top of the groove, a pair of ring members each comprising semicircular sections fitting in the ring groove against said shoulder, follower means between said spring member and said ring members to urge the latter upwardly on the shoulder to expand the ring members, and a locking pin projecting from said shoulder and engaging between the spaced ends of the upper ring member sections, a section of the lower ring member having a socket therein to receive the lower end of said locking pin whereby the locking pin may hold both of the ring members against turning relatively to one another and to the piston head.

8. In combination with a piston body having an upstanding central portion, a ring like head fitting about said central portion, said head provided with a ring groove having a wall inclined downwardly and inwardly from its circumferential face, an expansible piston ring in said groove fitting against said face, and spring means mounted between said piston body and ring like head for compressing the piston ring against said inclined face to close the groove and expand the piston ring against a cylinder wall.

LEO HENRY CORMIER.